United States Patent

[11] 3,528,354

| [72] | Inventors | Hiroshi Nakagawa<br>Tokyo, Japan;<br>Sizuyasu Yanagisawa, Tokyo, Japan |
|---|---|---|
| [21] | Appl. No. | 700,980 |
| [22] | Filed | Jan. 26, 1968 |
| [45] | Patented | Sept. 22, 1970 |
| [73] | Assignee | Tokyo Shibaura Electric Co. Ltd.<br>Kawasaki-shi, Japan<br>a corporation of Japan |
| [32] | Priority | Jan. 31, 1967 |
| [33] | | Japan |
| [31] | | No. 42/5769 |

[54] DEVICE FOR FLASHING A PHOTO-FLASH LAMP
6 Claims, 6 Drawing Figs.

[52] U.S. Cl. .................................................. 95/11.5,
431/95
[51] Int. Cl. .............................................. G03b 9/70
[50] Field of Search ...................................... 95/11.5,
11 (Lamp), 431/93, 94, 95

[56] References Cited
UNITED STATES PATENTS

| 2,872,857 | 2/1959 | Rich et al. ..................... | 95/11.5 |
| 2,972,937 | 2/1961 | Suits............................. | 95/11.5 |
| 3,211,069 | 10/1965 | Rixton.......................... | 95/11.5 |

*Primary Examiner*—John M. Horan
*Assistant Examiner*—Fred L. Braun
*Attorney*—Stephen H. Frishauf ABSTRACT: A photo-flash lamp firing device utilizing a piezo-electric element which includes an impact device interlocked with the shutter release button actuator for impacting the piezo-electric element to cause it to generate an impulse voltage synchronously with the releasing of the shutter of a camera. The impression of the high impulse voltage to the photoflash lamp causes the flashing thereof. The impacting device and the shutter release actuator are slideably mounted to the frame of the firing device and are coupled together by a pin and slot connection.

Patented Sept. 15, 1970

INVENTOR.

BY

DEVICE FOR FLASHING A PHOTO-FLASH LAMP

The present invention relates to a photoflash lamp firing device containing piezo-electric material as an igniting source.

The flash lamps heretofore used in (or with) a camera includes those which are lighted by the direct impression thereon of a cell voltage of 15 to 23 v. or those wherein the filament of a flash lamp is heated by the discharge electric current released from a charged condenser to ignite an igniting agent known as a primer, and the luminescent material contained in the bulb is further ignited by the combustion energy of the primer so as to cause the lamp to produce flashes due to the combustion of the luminescent material. Therefore the conventional type of flash lamp requires a battery and, if necessary, a condenser. However, the more frequently the battery is used, the more reduced will be its output voltage. This results in decreased luminescent properties of the flash lamp and inconstant flashing time. In addition, the battery is quickly exhausted and has to be replaced often, with the resultant increase in maintenance cost. Furthermore, since most of the flash lamps in conventional devices require filaments, their construction is complicated. What is worse, the filament of some flash lamps is sometimes broken before use. Thus the inclusion of a filament in the bulb presents difficulties in the manufacture of flash lamps which are ordinarily of small size. The foregoing are the drawbacks encountered in the conventional flash lamps.

The present invention has removed the aforementioned shortcomings. The use of a piezo-electric element as a power source for ignition has eliminated the necessity of providing a battery and condenser. Therefore the flash lamp can display constant luminescent properties, and it is unnecessary to replace the power source, because the same source can be used semipermanently. Furthermore, instead of a filament, there is provided a discharge gap between welds. The flash lamp of the present invention is of a type (hereinafter referred to as a "discharge flash lamp") wherein the combustion material sealed in the bulb is ignited by the discharge occurring in the gap.

It is accordingly an object of the present invention to offer a photoflash lamp illuminating device for a camera which is capable of using a flash lamp which is of simple construction and which can be manufactured at low cost.

Another object of the present invention is to provide with a device with a piezo-electric element, and to impinge, with a high mechanical pressure, on the piezo-electric element by means of elements interlocked with the action of pressing the camera shutter to generate a high voltage, and to illuminate the discharge flash lamp by impressing the high voltage thereon.

A further object of the present invention is to cause a far greater pressure to be applied to the piezo-electric element than the shutter pressure itself.

The illuminating device of the present invention includes a frame member, a piezo-electric element mounted into the frame member, and a push bar, slideably mounted in the frame and biased towards the shutter release button, for pressing the camera shutter release button. An impinging bar, coupled with the push bar and biased away from the piezo-electric element is caused to apply a great pressure on the piezo-electric element when the push bar is activated, the flash lamp being illuminated with the high voltage generated by the piezo-electric element due to the application of the powerful impingement thereon. A releaseable catch is provided to hold the push bar away from the shutter release button.

Figure 1:
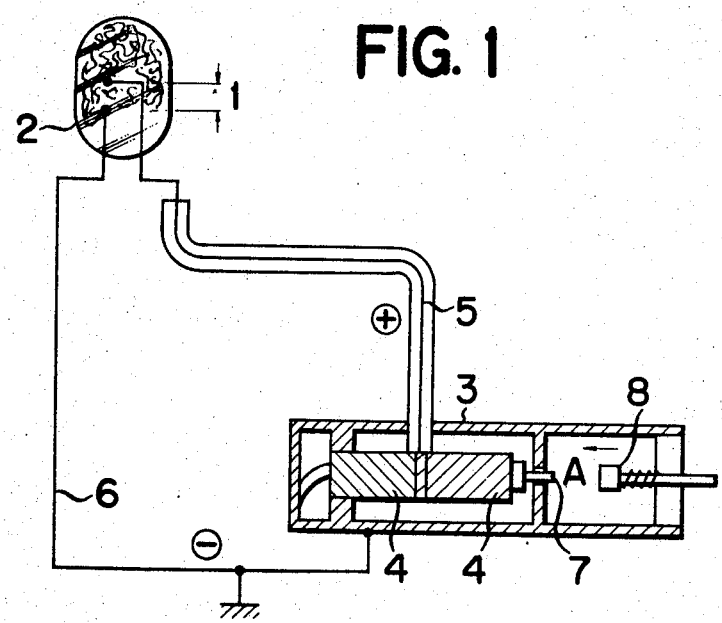
FIG. 1 is a diagrammatical view of a flashing device according to this invention.

Referring now to FIG. 1 of the accompanying drawings, electrodes defining a discharge gap 1 of a discharge type flash lamp 2 are connected to a high tension and a neutral output terminals of a piezo-electric element 4 through a high tension lead wire 5 and a grounded lead wire 6. The piezo-electric element 4 is supported by a metallic frame 3 and is provided with an impact receiving member 7 at its one end to oppose an impact member 8. Thus when impact member 8 is moved in the direction indicated by arrow A to strike the member 7, the piezo-electric element 4 will generate a high impulse voltage which is applied to the discharge type flash lamp 2 to cause it to ignite.

Figure 2:
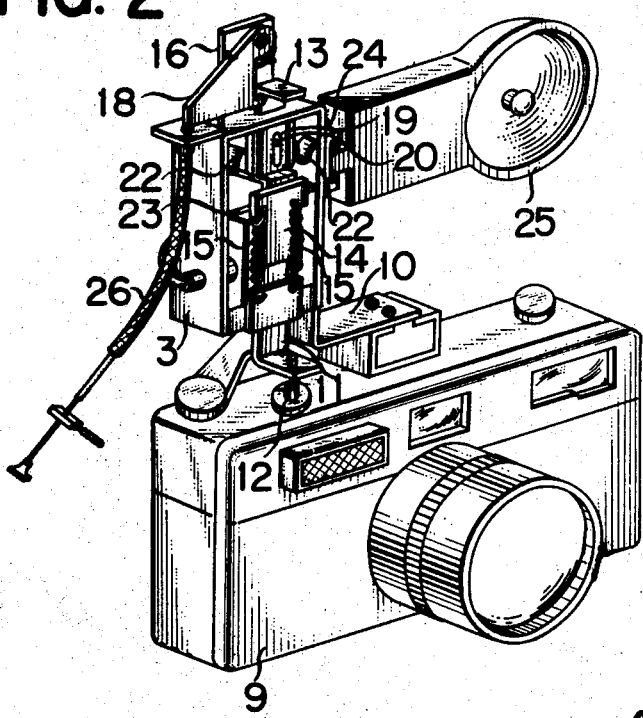
FIG. 2 is a perspective view of an embodiment of the flashing device.
Figure 3:
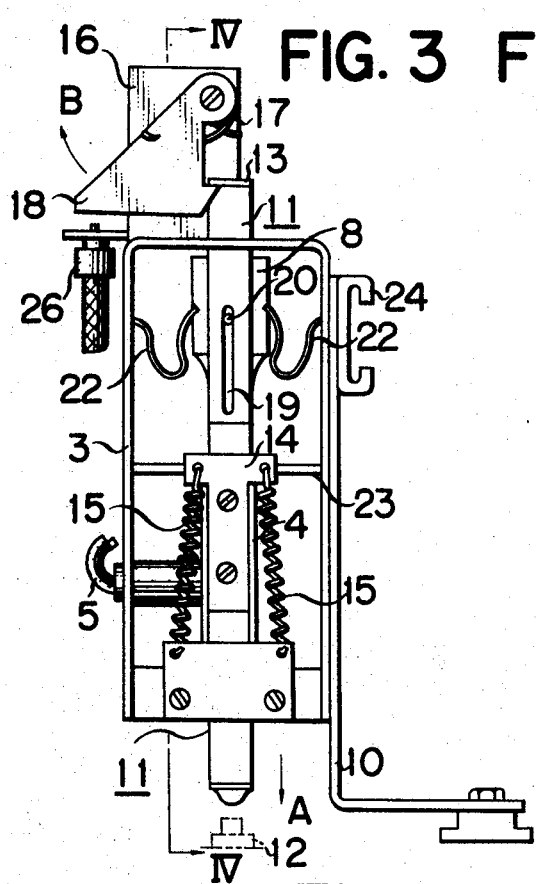
FIG. 3 is a front view of the flashing device shown in FIG. 2.
Figure 4:
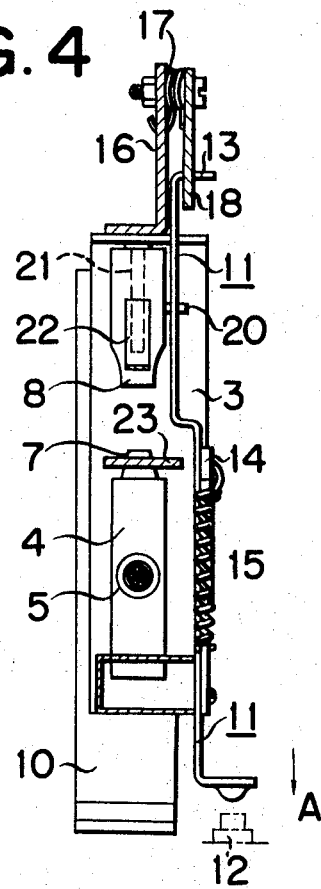
FIG. 4 is a side elevational view, partly in section, of the flashing device shown in FIG. 3.

FIGS. 2 to 4 illustrate details of one embodiment of this invention wherein a rectangular frame 3 made of metal is secured to a bracket 10 removably mounted on the accessary shoe secured to the upper surface of a casing 9 of a camera. Extending through the upper and lower yokes of the frame is a push member 11 with its opposite ends bent inwardly, the lower end serving as a push member cooperating with a shutter of the camera, while the upper end 13 being caught by a catch 18 in a manner to be described later. A letter T shaped plate 14 is secured to the push member 11 which is biased downwardly by means of coil springs 15. However, as shown in FIGS. 3 and 4, the push member 11 is normally held in its upper position against the bias of springs 15 because its upper end 13 is caught by the catch 18 pivotally supported by an upright support 16 and biased in the counter-clockwise direction by a spring 17 as viewed in FIG. 3. The push member 11 has a slot 19 at its center to loosely receive a pin 20 carried by the impact member 8 which is slideably fitted on a guide rod 21 secured to the frame 3 to be slidable in the vertical direction. As shown in FIG. 3 a pair of letter V shaped toggle leaf springs 22 are interposed between both sides of the impact member 8 and the frame 3. Beneath the impact member 8 is positioned the piezo-electric element with its impact receiving member 7 extending upwardly through a bracket 23. The lead wire 5 from the positive electrode of the piezo-electric element is connected to a reflector 25 for the flash lamp which is mounted on the frame 3 via a coupler 24 whereas the negative electrode to the reflector directly through the frame 3. A release wire cable 26 is provided to rotate the catch 18 in the clockwise direction.

The flashing device described above operates as follows.

At first it is supposed that the push member 11 is in its lower position wherein its lower end is engaging the shutter release button 12. When the push member 11 is moved upwardly by manually pulling its upper bent end 13 against springs 15, the pin 20 will engage the lower end of the slot 19 to move upwardly the impact member 8 along guide rod 21 against the action of the toggle springs 22. At the same time the upper bent end 13 urges the catch 18 in the clockwise direction against the action of coil spring 17. As the push member is further elevated, the catch 18 will be rotated in the counter-clockwise direction back to the position shown in FIG. 3 and when the impact member 8 passes through the dead point of toggle springs 22, it will be snapped upwardly about the upper yoke of the frame 3 by the strong resilient force of the toggle springs thus separating the pin 20 from the bottom of the slot 19. When the push member 11 is released at this time, it will be lowered by coil springs 15 until its upper bent end 13 is caught by the catch 18. Thus, various parts will assume the position shown in FIGS. 3 and 4 and the pin 20 will assume a position near the upper end of the slot 19. When the release wire cable 26 is operated under this condition, the catch 18 will be rotated in the clockwise direction to release the push member 11, permitting it to actuate the shutter release button 12. Downward movement of the push member 11 causes downward movement of the impact member 8 by the engagement of pin 20 with the upper end of the slot 19. When the impact member 8 is moved past through the dead center of toggle springs 22 it will be snapped to strongly blow the member 7 of the piezo-electric element by the strong resilient force of the toggle springs. Consequently, the piezo-electric element 4 will generate a high impulse voltage, say about 8,000 v. to cause an electric arc to appear across the discharge gap of the flash lamp, thus causing it to flash after about 25 microseconds, for example.

Figure 5:
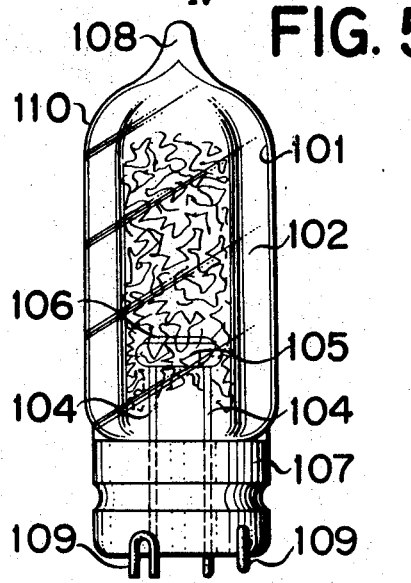
FIG. 5 is an elevational view, partly in section, of a flash lamp to be utilized for the flashing device according to this invention.
Figure 6:
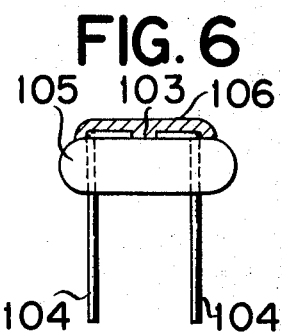
FIG. 6 is an enlarged view of the mount of the flash lamp shown in FIG. 5.

FIG. 5 shows one example of a discharge type flash lamp which is suitable for use in the flashing device. As shown in FIG. 6, the upper ends of the lead-in wires 104 are bent toward each other along the upper surface of the support 105 to form the discharge gap 103 therebetween. The gap between discharge electrodes may be about 1.0 to 1.2 mm, for example. A coating of an ignition agent or primer bead 106 is applied to cover the discharge electrodes. The discharge type flash lamp comprises a sealed light transmitting envelope 101 such as a transparent glass bulb, a quantity of metallic combustible material 102 in said envelope of about 40 milligrams of zirconium or aluminum shredded foils, a filling of combustion accelerating gas such as oxygen gas in said envelope, the weight of said gas being substantially in stoichiometric balance, and a discharge gap 103 between the pair of electrodes or lead-in wires 104 sealed in said envelope and separated securely by a bead glass 105. An explosion proof coating 110, if desired, may be coated onto the outer surface of the bulb.

FIG. 6 is an enlarged front view of essential portions of FIG. 5.

Upon application of the high impulse voltage generated by the piezo-electric element 4, an electric arc will be struck across discharge electrodes 105 to ignite the coating 106 of the ignition agent and hence the flashing metallic combustible material 102, thus providing a flash of light.

Ordinarily, as the ignition agent, a paste is utilized consisting of 100 parts by weight of zirconium powder, about 50 parts by weight of potassium chlorate and about ten parts by weight of nitrocellulose solution in acetate ester solvent.

While the invention has been described in connection with some preferred embodiments thereof, the invention is not limited thereto and includes any modifications and alterations which fall within the true spirit and scope of the invention as defined in the appended claims.

We claim:

1. A device, for use with a camera, for flashing a discharge type photo-flash lamp comprising:
   a frame;
   a piezo-electric element mounted to said frame;
   an impact means for applying a mechanical impact to said piezo-electric element to generate a high impulse voltage, said impact means having an impact member slideably mounted to said frame and slideable toward and away from said piezo-electric element, and spring means biasing said impact member normally away from said piezo-electric element;
   means for operating a shutter release button of the camera including a push member in registration with said shutter release button slideably mounted to said frame and slideable in a direction substantially parallel with the direction of movement of said impact member, means biasing said push member toward said shutter release button, and a catch means to normally hold said push member away from said shutter release button;
   a pin-and-slot coupling means coupling said impact and push members together; and
   means coupled to said catch means for releasing said push member to actuate said shutter release button and cause said impact member to impact said piezo-electric element to flash said photo-flash lamp.

2. The device according to claim 1 wherein said frame includes a connector for removably attaching the device to the camera; and a holder for securing a flash lamp reflector in position.

3. The device according to claim 1 wherein said release means includes a release wire cable to disengage said catch from said push member, thereby causing said shutter release button to be actuated and said piezo-electric element to be impacted.

4. The device according to claim 1 comprising means coupling said high impulse voltage to a pair of electrodes of said photo-flash lamp.

5. The device according to claim 1 wherein said discharge type photo-flash lamp comprises:
   a sealed light transmitting envelope;
   a quantity of metallic combustible material in said envelope;
   a combustion accelerating gas sealed in said envelope;
   a support member in said envelope;
   a pair of discharge electrodes bent toward each other along the upper surface of said support member;
   a coating of an ignition agent applied to cover said discharge electrodes; and
   the high impulse voltage generated by said piezo-electric element being applied said electrodes of said photo-flash lamp.

6. The device according to claim 1 wherein said spring means biasing said impact member normally away from said piezo-electric member comprises a toggle spring means.